United States Patent
Lu et al.

(10) Patent No.: US 6,666,422 B1
(45) Date of Patent: Dec. 23, 2003

(54) FOLDABLE HINGE BRACKET FOR A LAPTOP COMPUTER

(75) Inventors: Sheng-Nan Lu, Shulin (TW); Ching-Hsiang Hsu, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 0 days.

(21) Appl. No.: 10/307,716

(22) Filed: Dec. 2, 2002

(51) Int. Cl.[7] ................................................ E04G 3/00
(52) U.S. Cl. ........................ 248/291.1; 16/340; 248/922
(58) Field of Search .................... 248/291.1, 292.12, 248/292.13, 292.14, 447, 457, 458, 917, 919, 920, 921, 922, 923; 361/681; 16/340, 337

(56) References Cited

U.S. PATENT DOCUMENTS 5,772,351 A * 6/1998 Ching .......................... 403/111
5,913,351 A * 6/1999 Miura ........................... 16/340
6,064,565 A * 5/2000 Ishihara et al. ............. 361/681
6,539,582 B1 * 4/2003 Chae ............................ 16/340
6,581,893 B1 * 6/2003 Lu ........................... 248/291.1

OTHER PUBLICATIONS

Patent application Publication No US 20030122046 A1 to Lee; Publication date Feb. 21, 2002.*
Patent application Publication No US 2003/0122046 A1 to Huong; Publication date Jul. 3, 2003.*

* cited by examiner

Primary Examiner—Ramon O. Ramirez
(74) Attorney, Agent, or Firm—William E. Pelton, Esq.

(57) ABSTRACT

A hinge bracket has a positioning disk adapted to be abutted to one side of the leg of the frame and having a first cutout and a second cutout peripherally defined around the positioning disk and a pad sandwiched between the positioning disk and one of the second leaf springs. The pad has a finger alternately corresponding to the first cutout and the second cutout so that the frame is able to be supported at a first position or the frame is able to be extended at a second position to be in parallel with the base to minimize space taken when stored or transported.

2 Claims, 7 Drawing Sheets

FOLDABLE HINGE BRACKET FOR A LAPTOP COMPUTER

BACKGROUND OF THE INVENTION

1. Field of the Invention

The present invention relates to a foldable hinge bracket for a laptop computer, and more particularly to a foldable hinge bracket that is able to be folded for storage or transportation to save space.

2. Description of Related Art

A conventional hinge bracket is provided between the screen and the panel of a laptop computer to allow the screen to pivot relative to the panel. Normally, after the hinge bracket is mounted on the laptop computer, the hinge bracket is able to provide necessary friction to the screen so as to support the screen at a predetermined position or to provide reasonable space for the screen to pivot with respect to the panel so that the screen is able to engage with the panel. However, when the hinge bracket is not assembled on the laptop computer, the conventional hinge bracket, within a limited space to pivot, takes large space when storage or transportation becomes necessary, which is a great concern for the manufacturer when the issue turns to cost.

To overcome the shortcomings, the present invention tends to provide an improved hinge bracket for a laptop computer to mitigate and obviate the aforementioned problems.

SUMMARY OF THE INVENTION

The primary objective of the present invention is to provide an improved hinge bracket which is foldable so that the hinge bracket is able to be extended in parallel such that the space taken by the hinge bracket when transported or stored is minimized. Therefore, the user is able to have more room available to store hinge brackets than before.

In order to accomplish the foregoing objective, the hinge bracket has a pad with a finger laterally extending out of the pad and a positioning disk with a first cutout and a second cutout alternately corresponding to the finger so that the finger is able to rest in the first cutout or the second cutout depending whether the hinge bracket is to be extended or folded.

Other objects, advantages and novel features of the invention will become more apparent from the following detailed description when taken in conjunction with the accompanying drawings.

DETAILED DESCRIPTION OF THE PREFERRED EMBODIMENT

Figure 1:
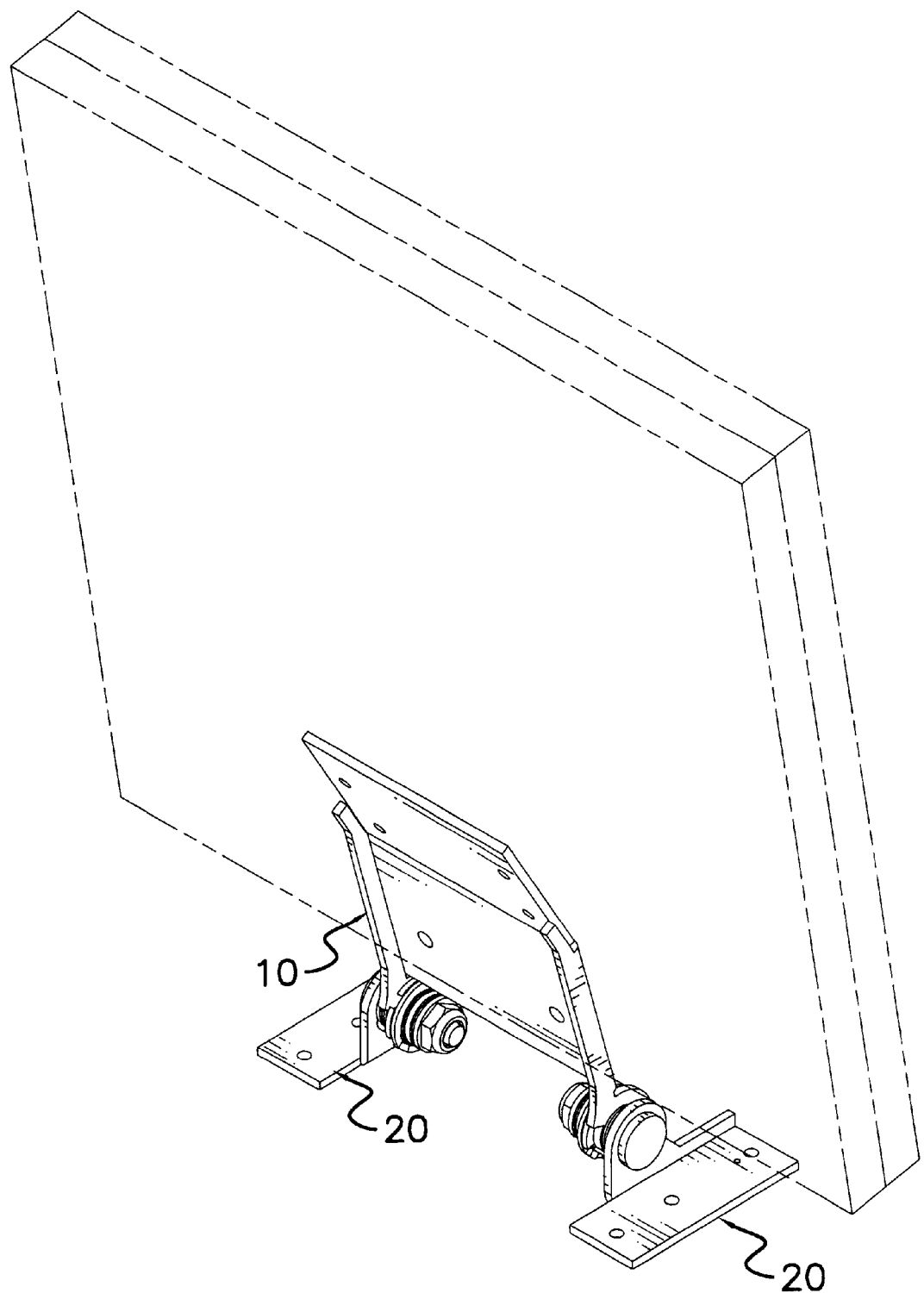
FIG. 1 is a schematic view showing that the hinge bracket of the present invention is applied to support a screen of a laptop computer.

With reference to FIG. 1, the hinge bracket in accordance with the present invention is employed to support the screen (in dashed lines) of a laptop computer (not shown). The hinge bracket of the present invention includes a frame (10) to be firmly fixed to the screen and a base (20) to be firmly fixed to a surface, i.e. the panel of the laptop computer.

Figure 2:
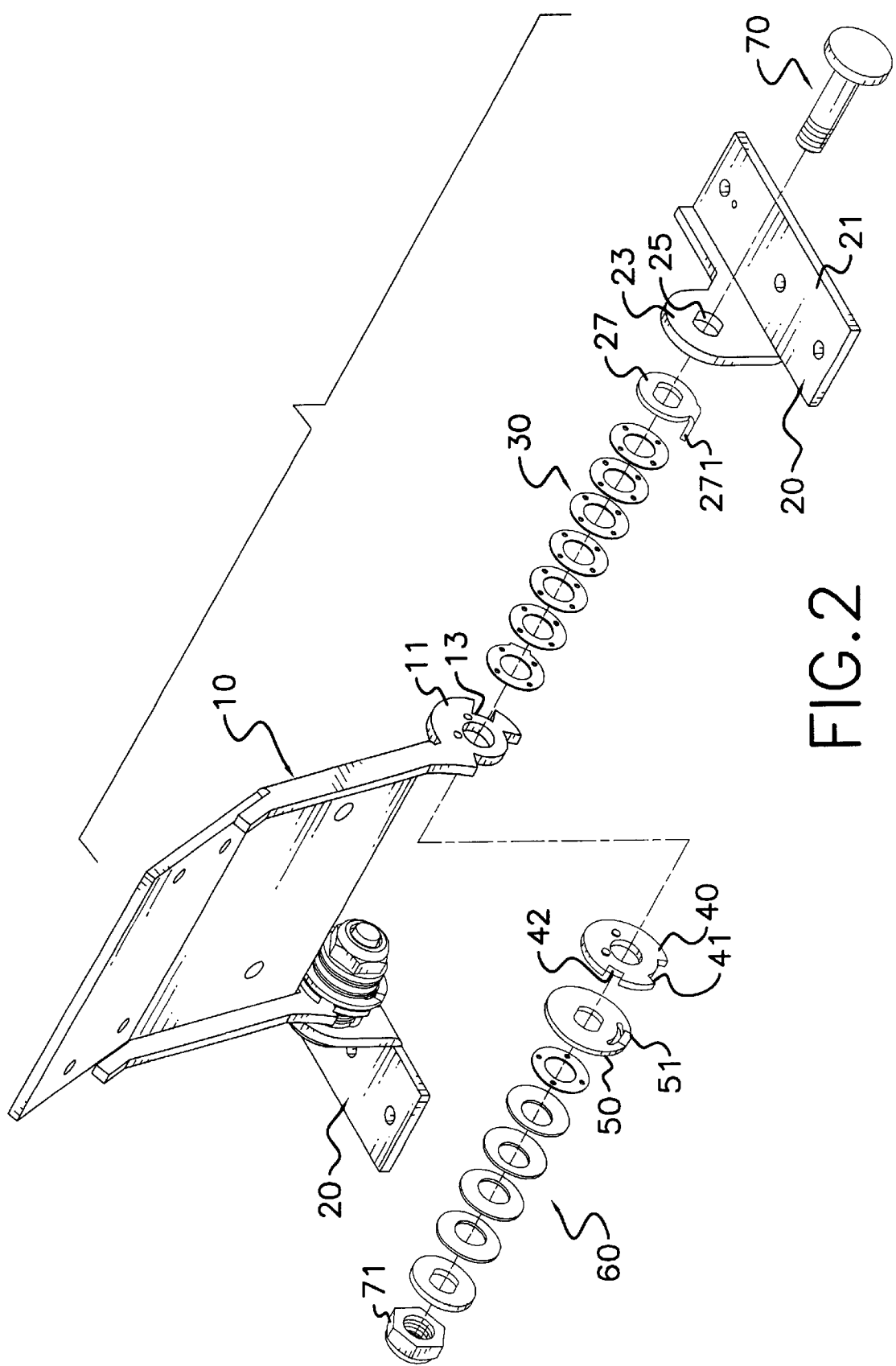
FIGS. 2 and 3 are exploded perspective views of the hinge bracket showing parts of the hinge bracket.
Figure 3:
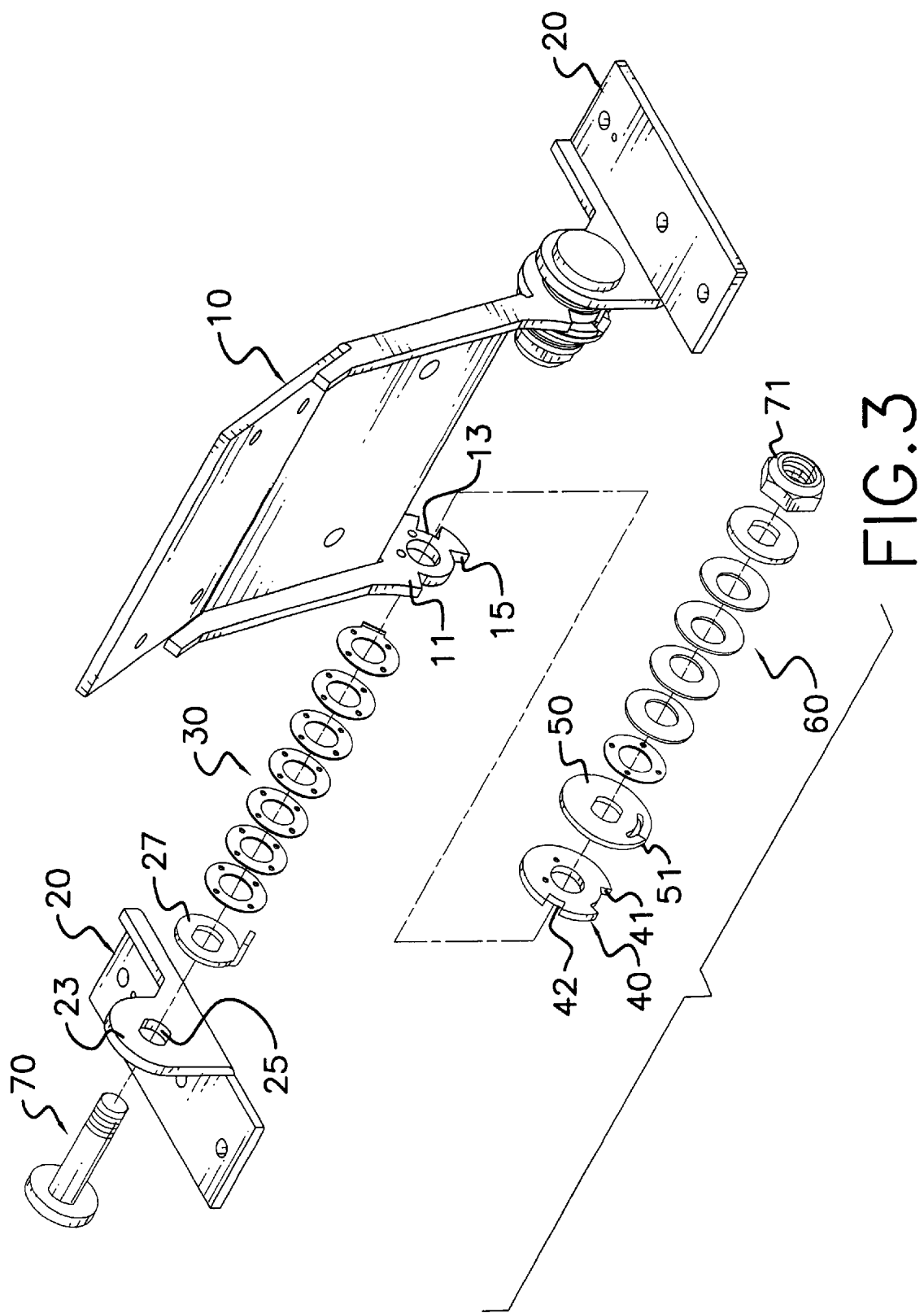

With reference to FIGS. 2 and 3, the hinge bracket of the present invention further has multiple leaf springs (30), a positioning disk (40), a pad (50), multiple second leaf springs (60), a bolt (70) and a nut (71).

The frame (10) has two legs (11) respectively formed on opposite side faces of the frame (10). Each leg (11) has a first limit notch (13) and a second limit notch (15) respectively formed on a distal end of the leg (11). The second limit notch (15) has a length longer than that of the first limit notch (13).

The base (20) has a bottom plate (21) and an upright plate (23) vertical to the bottom plate (21) and having a through hole (25) extending through the upright plate (23). A stop (27) is sandwiched between the upright plate (23) and one of the first leaf springs (30) and has an extension (271) extending out to correspond to the second limit notch (15).

The positioning disk (40) has a first cutout (41) and a second cutout (42) both peripherally defined around the positioning disk (40).

The pad (50) has a finger (51) formed on a side face of the pad (50) to alternately correspond to the first and second cutouts (41,42). To facilitate movement of the finger (51) between the first and second cutouts (41,42), the finger (51) has a domed top face. Because both sides of the hinge bracket of the present invention include the same parts, detailed description will focus only one side of the hinge bracket for clarity.

Figure 4:
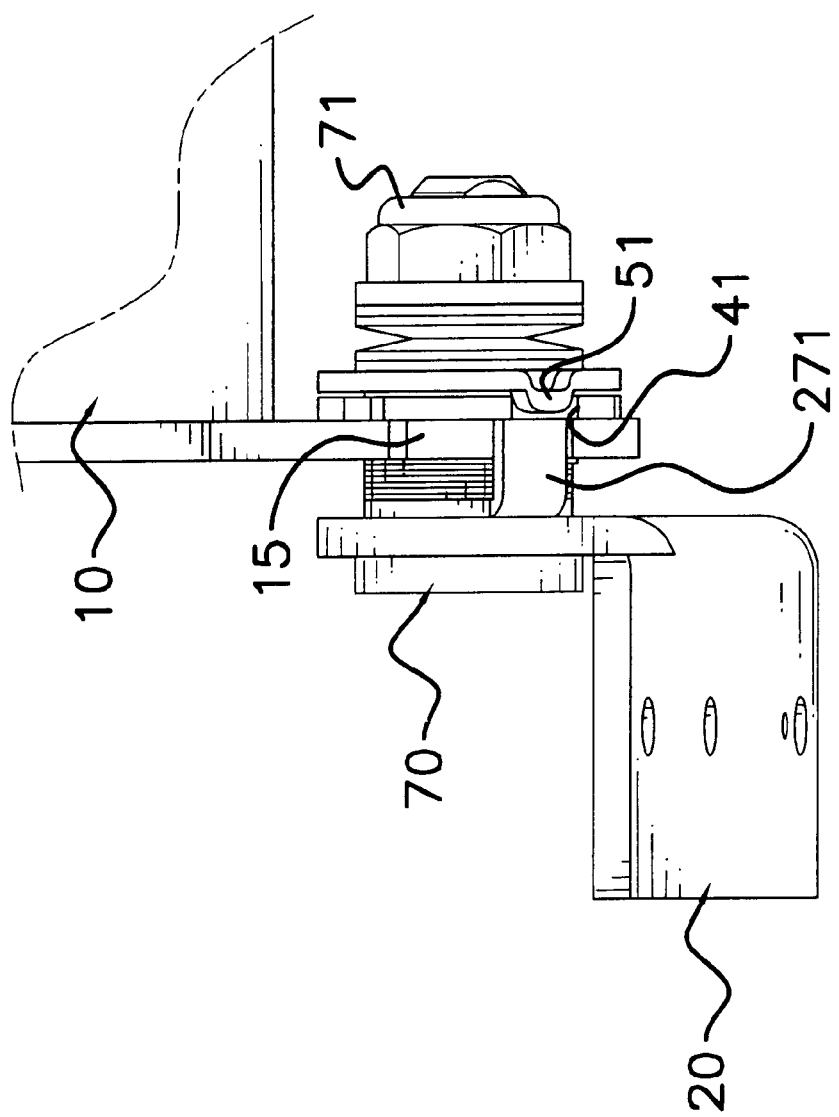
FIG. 4 is a side plan view showing the relationship between the finger of the pad and the first cutout of the positioning disk.
Figure 5:
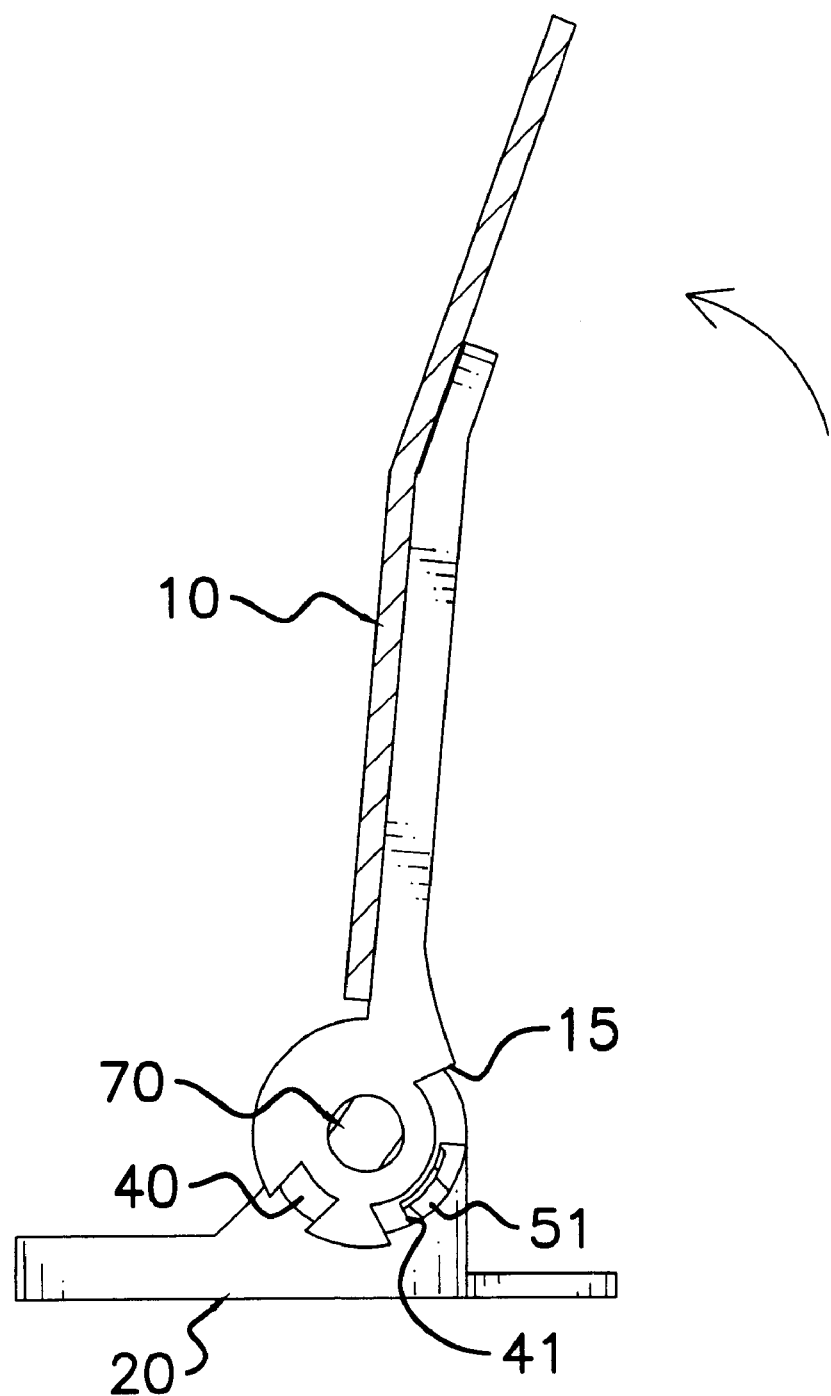
FIG. 5 is a schematic view showing the finger is received in the first cutout and the frame is upright relative to the base.

With reference to FIG. 4, when in assembly, the bolt (70) sequentially extends through the through hole (25), the stop (27), the first leaf spring (30), the distal end of the leg (11), the positioning disk (40), the pad (50), the second leaf springs (60) and into the nut (71) to secure the foregoing parts on opposite sides of the leg (11).

After the aforementioned assembly is finished, it is noted that the extension (271) has a width smaller than the length of the second notch (15) so that the extension (271) is able to slide in the second notch (15). That is, when the frame (10) pivots relative to the base (20), the extension (271) slides from a first position (second position) to a second position (first position) in the second notch. Furthermore, when the finger (51) is received in the first cutout (41) after assembly, the frame (10) is upright relative to the base (20). Under this situation, the user is able to check if the hinge bracket is able to function normally.

Figure 6:
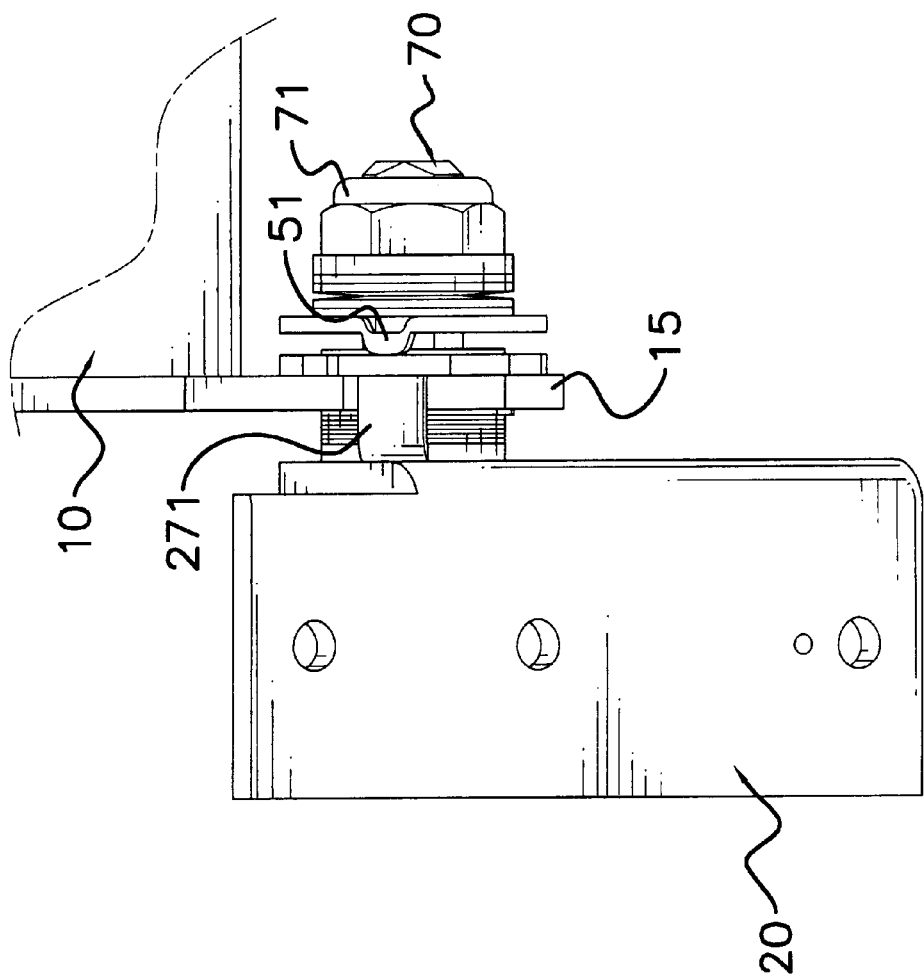
FIG. 6 is a side plan view showing the relationship between the finger of the pad and the second cutout of the positioning disk.
Figure 7:
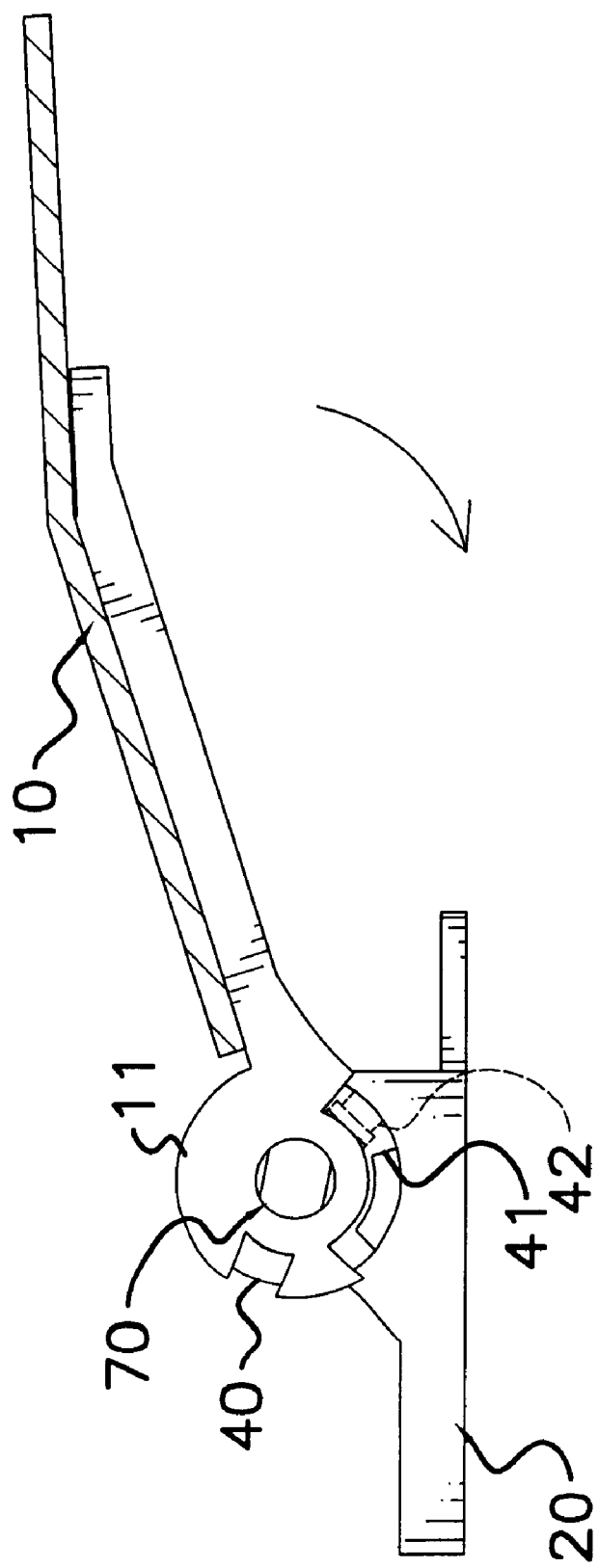
FIG. 7 is a schematic view showing the finger is received in the second cutout and the frame is horizontal relative to the base.

With reference to FIGS. 6 and 7, when the frame (10) is upright relative to the base (20), the user is able to pivot the frame (10) to allow the frame (10) to be in parallel with the base (20). That is, the finger (51) moves from the first cutout (41) to the second notch (42) while the frame (10) pivots relative to the base (20). After the frame (10) is in parallel to the base (20), the space taken by the hinge bracket is minimized so that more of the present hinge bracket can be stored in the same space as prior art brackets, thereby lowering costs of storage and transportation.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. In a foldable hinge bracket having a frame provided with two legs respectively formed on opposite sides of the frame, a base equipped with an upright plate vertical to a bottom plate of the base to be pivotally connected to a first side of one of the legs, a stop securely abutted against one side of the upright plate and having an extension extending out of the stop, first leaf springs sandwiched between the stop and the first side of one of the legs, second leaf springs securely connected to a second side of one of the legs and a bolt and nut combination extending through the upright plate, the stop, the first leaf springs, the leg and the second leaf springs to secure the base, the stop and the first leaf springs to the first side of the leg and the second leaf springs to the second side of the leg, wherein the improvement comprises:

the leg has a first limit notch defined to allow the extension of the stop to slide inside the first limit notch, a positioning disk is adapted to be abutted to the second side of the leg and has a first cutout and a second cutout peripherally defined around the positioning disk, a pad sandwiched between the positioning disk and one of the second leaf springs has a finger alternately corresponding to the first cutout and the second cutout so that the frame is able to be supported at a first position or the frame is able to be extended at a second position to be in parallel with the base to minimize space taken when stored or transported.

2. The foldable hinge bracket as claimed in claim 1, wherein the finger has a domed top face to facilitate movement of the finger between the first and second cutouts of the positioning disk.

* * * * *